United States Patent [19]

Toft et al.

[11] Patent Number: 4,879,264

[45] Date of Patent: Nov. 7, 1989

[54] METHOD OF MAKING CATALYST AND CATALYST PRECURSOR CONTAINING VANADIUM AND ANTIMONY

[75] Inventors: Mark A. Toft, Lakewood; James F. Brazdil, Jr., Mayfield Village; Linda C. Glaeser, Lyndhurst, all of Ohio

[73] Assignee: The Standard Oil Company, Cleveland, Ohio

[21] Appl. No.: 270,987

[22] Filed: Nov. 14, 1988

[51] Int. Cl.$^4$ .......................... B01J 23/18; B01J 23/22; B01J 35/08

[52] U.S. Cl. .......................................... 502/8; 502/353

[58] Field of Search ...................................... 502/8, 353

[56] References Cited

U.S. PATENT DOCUMENTS 3,860,534  1/1975  Harris et al. ........................ 502/353
3,984,353 10/1976  Sergunkin et al. .................. 502/338
4,746,641  5/1988  Guttmann et al. .............. 502/353 X Primary Examiner—W. J. Shine
Attorney, Agent, or Firm—C. S. Lynch; D. J. Untener; L. W. Evans

[57] ABSTRACT

Disclosed is a method of making a catalyst precursor by aging an aqueous solution containing the monoperoxovanadium ion, $VO(O_2)^+$, until a vanadium-containing sol or gel is formed, and reacting said vanadium while in said aqueous sol or gel form, with an antimony compound that contains Sb having a valence of 3. In one embodiment, the $VO(O_2)^+$ ion is made by reacting $H_2O_2$ with a vanadium compound.

Also disclosed is making a catalyst by drying and calcining such precursor. When the drying is effected by spray drying a microspheroidal catalyst is produced. The catalysts useful for ammoxidation of propane are more attrition resistant than catalysts of the same empirical formula made by prior art methods.

20 Claims, No Drawings

METHOD OF MAKING CATALYST AND CATALYST PRECURSOR CONTAINING VANADIUM AND ANTIMONY

This invention concerns a method of making catalyst precursors and catalysts containing vanadium and antimony in oxide form, the catalyst precursor so made, and microspheroidal catalyst made from such precursor.

Harris et al. British specification Nos. 1,336,135 and 1,336,136 disclose making catalysts from $V_2O_5$ and $Sb_2O_5$ slurries that are mixed, dried and calcined. These are used to ammoxidize alkanes such as propane. Harris U.S. Pat. No. 3,860,534 has similar disclosures but the calcined catalyst is washed with water before use to remove soluble vanadium compounds. Th dried and calcined material in the Harris method, however, is relatively weak and has low abrasion resistance. More important is the fact that the Harris material in the dried state is a fine talcum powder-like material. Thus, it is not possible to spray dry the Harris slurry to obtain microspheroidal particles large enough for fluidized bed catalysis, generally in the 40–100 micron range.

It is an object of the invention to provide a method of making a catalyst precursor having vanadium and antimony in oxide form, capable of being processed to form a catalyst having good hardness and attrition resistance.

Another object is to provide such a precursor.

A further object is to provide a method of making a hard, attrition-resistant catalyst containing vanadium and antimony in oxide form.

Still another object is to provide a method of making a microspheroidal catalyst containing vanadium and antimony in oxide form, and the micropheroidal catalyst so made.

Other objects, as well as aspects, features and advantages, of the present invention will become apparent from a study of the accompanying disclosure and the claims.

According to one aspect of the invention there is provided a method of making a catalyst precursor having vanadium and antimony in oxide form in the atomic ratio of Sb to V in the range from 0.8 to 4, usually from 1 to 3, by aging an aqueous solution containing the monoperoxovanadium ion, $VO(O_2)^+$, until a vanadium-containing sol or gel is formed, and reacting said vanadium while in said aqueous sol or gel form, with an antimony compound which contains Sb having a valence of 3, thereby reducing the average valence of the vanadium to less than 5 and oxidizing antimony to a valence state of 5. At least a portion of the $Sb^{+3}$ is so oxidized, not necessarily all.

According to a more specific aspect of the invention, the foregoing is accomplished by reacting $H_2O_2$ in aqueous solution with a vanadium compound, aging the reaction solution, and then reacting the antimony compound as above stated. Thus, according to this aspect, there is provided a method of making a catalyst precursor having vanadium and antimony in oxide form in the atomic ratio of Sb to V in the range of 0.8 to 4, usually from 1 to 3, by reacting a vanadium compound with an aqueous hydrogen peroxide solution to form a dispersion containing the monoperoxovanadium ion, $VO(O_2)^+$, in solution, aging the reaction solution to form a vanadium-containing sol or gel, and reacting the latter with an antimony compound which contains Sb having a valence of 3, thereby reducing the average valence of the vanadium to less than 5 and oxidizing antimony to a valence state of 5, wherein the ratio of moles of $H_2O_2$ to atoms of V is at least 1. This ratio can be 1 or any amount over 1, but a ratio of 10 or less is usually sufficient.

By the term "sol" is meant a suspension of colloidal particles. By the term "gel" is meant an intricate and substantially amorphous three-dimensional solid network dispersed in a liquid, wherein both the solid and the liquid phases are continuous. The initial vanadium compound reactant in the latter aspect of the invention can be an inorganic or an organic compound of vanadium, but is usually an inorganic compound. The vanadium in the compound can have any initial valence. A partial list of such compounds includes any oxide of vanadium, such as $V_2O_5$, $V_7O_{13}$, VO, $VO_2$, $V_2O_3$, $V_3O_7$, etc.; any vanadium oxyhalide such as $VOCl_3$, $VOCl_2$, $(VO_2)Cl$, VOCl, VOBr, $VOBr_2$, $VOBr_3$; any vanadium halide such as $VF_3$, $VBr_3$, $VCL_2$, $VCl_3$, $VCl_4$, $VF_5$; vamadu; sulfate; meta-vanadic acid; pyro-vanadic acid; in short, any compound of vanadium that will react with an aqueous $H_2O_2$ solution.

The vanadium compound usually used in the reaction with $H_2O_2$ is one of the oxides. Because of availability and cost, $V_2O_5$ is often the compound that is chosen to react with the hydrogen peroxide.

Antimony compound reactants chosen to react with the monoperoxovanadium ion in making the catalyst precursor of the invention can be an organic or an inorganic compound of antimony. A partial list of such compounds includes any of the following types of compounds containing antimony having a valence of 3: any such antimony oxide such as $Sb_2O_3$ and $Sb_2O_4$; SbOCl; any such antimony halide such as $SbBr_3$, $SbCl_3$, $SbF_3$ and $SbI_3$.

The antimony compound usually chosen to react with the peroxovanadium ion in either aspect of the invention is one of the antimony oxides containing antimony having a valence of 3. Because of availability and cost $Sb_2O_3$ is ordinarily the chosen oxide. Of course, when the antimony compound is $Sb_2O_4$, the half of the Sb that is 5-valent is not useful to effect reduction of the 5-valent vanadium.

It will be understood that the method includes the embodiment where other catalyst additives are present during the process. In most cases other compounds can be added after the vanadium and antimony reaction has taken place. This includes compounds of elements such as Sn, Fe, Cu, Mg and Li, for instance. Compounds of some elements such as Ti that form peroxo compounds can also be added before or with the addition of the $H_2O_2$, but are usually most conveniently added after the vanadium and antimony compounds have reacted, as before noted.

We are aware of U.S. Pat. No. 3,984,353 wherein $Sb_2O_3$ is contacted with $H_2O_2$ and oxidized to $Sb_2O_5$ and the latter is reacted with a compound of certain metals, such as the oxide, and the obtained product is dried and calcined at up to 700° C. The list of second metals includes V. This process, of course, is contrary to the present process.

In another aspect of the invention a catalyst precursor is provided which is the product of the process of any one of the foregoing methods.

In still another aspect of the invention there is provided a process for making a catalyst which comprises drying a precursor made by one of the foregoing processes and thereafter calcining the resulting dried product at a maximum temperature in the range 650° to 1000° C., usually 700° to 875° C., and most particularly in the range from 750° to 850° C. When the drying is a spray drying step, the product is a microspheroidal catalyst having particle diameters including the range from 10 to 200 microns.

The following examples illustrate the invention but are not to be considered in any way limiting.

Comparative Example A

A catalyst was made as taught by Harris U.S. Pat. No. 3,860,534, as follows:

Powdered $V_2O_5$ (27.58 g) and $Sb_2O_3$ (72.56 g) were slurried in 80 cc of water and 80 cc of concentrated nitric acid. The orange slurry was heated on a hotplate until nearly dry, then dried overnight at 130° C. It was the heat treated at 650° C. for 8 hours. It was very soft and powdery.

Half of the catalyst precursor was then mixed with 1 percent of graphite, pelleted, crushed and screened to 20-35 mesh. It was activated by calcining at 810° C. for 1 hour, then cooled to 500° C. and taken from the oven. It was placed in a funnel and washed with warm water running through the catalyst until no color appeared in the filtrate (about 2 hours).

An attrition, or particle size retention, test was carried out on a portion of the activated catalyst. The test procedure is as follows:

A 2 g sample of the catalyst (20/35 mesh) is weighed accurately and placed in a 4 oz. round jar with a screw-on lid, along with 15 BB pellets (4.5 mm., Zn-plated steel). The jar is closed and placed on the rollers of a ball mill. It is then rolled for 1 hour. The contents of the jar are then placed on stacked 20/35 mesh screens to remove any pellets and the fines. The material retained on 35 mesh is then weighed. The particle size retention is reported as percent of the original weight.

The particle size retention was 41%, far too low to be a viable commercial fluid bed catalyst. The same particle size retention test was carried out on an attrition resistant bismuth molybdate type catalyst composition used in commercial fluidized bed propylene ammoxidation operations, and the particle size retention was 78%.

EXAMPLE 1

26.99 g of $V_2O_5$ powder were slurried in 600 cc of water in a 2 liter beaker. While vigorously stirring, 175 g of a 30% $H_2O_2$ solution in water was added in three aliquots of 70 g/70 g/35 g, and the $V_2O_5$ began to dissolve. This is the step in which the peroxovanadium ion forms. About 10 minutes elapsed between each aliquot addition. Stirring was continued for 45 minutes longer and a red solution which formed slowly formed a sol.

73.15 g of powdered $Sb_2O_3$ was added to the foregoing sol to form a catalyst precursor of the claims. The mixture was stirred for about 4 hours with heating (reflux). During this time the dispersion gradually turned green, then black. Initially, the dispersion became quite viscous, but thinned out with addition of 100 cc of water while still refluxing. The slurry was then evaporated on a hotplate to near dryness and then completely dried in an oven at 130° C. overnight. Thereafter it was calcined for 8 hours at 650° C., cooled and then crushed and sieved to 20-35 mesh.

A portion of this catalyst was activated by calcining for 1 hour at 810° C. The calcined material was very hard.

A portion of this activated catalyst was washed with water in a Soxhlet extractor for several hours until the wash water appeared clear. The washed catalyst was then dried by heating at about 100° C. for about 3 hours. It was still very hard and of a particle size of 20-35 mesh. The composition was $VSb_{1.7}O_x$.

EXAMPLE 2

26.36 g of $V_2O_5$ powder were slurried in 600 cc of water in a 2 liter beaker. While vigorously stirring, 175 g of a 30% $H_2O_2$ solution in water was added in three aliquots of 70 g/70 g/35 g, and the $V_2O_5$ began to dissolve. This is the step in which the peroxovanadium ion forms. About 15 minutes elapsed between each aliquot addition. Stirring was continued for several hours longer and a red solution which formed slowly formed a sol. This sol was stirred for about 16 more hours and formed a gel.

With stirring, about 400 cc water was added to the gel to thin it down to a less viscous sol or gel. 71.47 g of powdered $Sb_2O_3$ was added with stirring to form an orange slurry, which after refluxing for 3 hours was deep green. This was a catalyst precursor of the claims. Then 19.7 g of a 11.7% $TiO_2$ sol was added with stirring.

The slurry was then evaporated to near dryness and the resulting paste dried overnight in an oven at 140° C. These dried solids were then calcined, crushed and sieved and activated exactly as in Example 1. This was the final catalyst, which was not washed. The final calcined catalyst was very hard.

Comparative Example B

A catalyst was prepared starting with $Sb_2O_3$ and $V_2O_5$, according to the method taught by U.S. Pat. No. 3,984,353, as follows:

72.56 g of $Sb_2O_3$ were refluxed for 5 hours in 70 g of 30% $H_2O_2$ and 250 cc water. A milky-appearing sol or suspension was formed. 70 g additional 30% $H_2O_2$ was added and the dispersion was poured into a large beaker containing 27.58 g $V_2O_5$ and this was stirred 15 minutes until evolution of gas bubbles stopped. The resulting orange slurry was evaporated to near dryness and then dried overnight at 100° C. It was then calcined at 650° C. for 8 hours. It was then broken into large particles calcined at 810° C. for 1 hour, cooled, crushed and sieved to 20-35 mesh, then washed with water and dried, as in Example 1.

The catalysts of the present invention are all useful for the ammoxidation of propane to acrylonitrile and associated products. Examples of such ammoxidations are included in the following specific examples.

In the ammoxidation runs of the following examples, the catalyst is in a tubular ⅜ inch I.D. stainless steel fixed bed reactor. The reactor is equipped with a preheat leg and is immersed in a temperature controlled molten salt bath. The gaseous feed components are metered through mass flow controllers into the bottom of the reactor through the preheat leg. Water is introduced through a septum at the top of the preheat leg, using a syringe pump. The feed is fed to the catalyst for a pre-run time before collection of product; the runs of each example last 30-60 minutes during which the product is collected for analysis.

In the examples the conversion, yield and selectivity are defined as follows:

$$\text{conversion} = \frac{\text{moles propane reacted}}{\text{moles propane charged}} \times 100\ (\%)$$

-continued $$\text{yield} = \frac{\text{moles product produced}}{\text{moles propane charged}} \times 100\ (\%)$$

$$\text{selectivity} = \frac{\text{moles product produced}}{\text{moles propane reacted}} \times 100\ (\%)$$

EXAMPLE 3

In this example the pre-run time was 1 hour. The catalyst was the catalyst of Example 1. The reaction temperature was 470° C. and the molar feed ratios were 5 propane/1 NH$_3$/2 O$_2$/1 H$_2$O/. The contact time was 2.2 seconds.

Results for this and the following ammoxidation runs are shown in Table 1. C$_3$= is propylene. AN is acrylonitrile.

EXAMPLE 4

In this example the pre-run time was 19 hours. The catalyst was the catalyst of Example 2. The reaction temperature was 470° C. and the molar feed ratios were 5 propane/1 NH$_3$/2 O$_2$/1 H$_2$O. The contact time was 2.2 seconds.

Comparative Example C

In this example the pre-run time was 0.8 hours. The catalyst was the catalyst of Example A. The reaction temperature was 470° C. and the molar feed ratios were 5 propane/1 NH$_3$/2 O$_2$/1 H$_2$O. The contact time was 1.8 seconds.

Comparative Example D

In this example the pre-run time was 0.8 hours. The catalyst was the catalyst of Comparative Example B. The reaction temperature was 470° C. and the molar feed ratios were 5 propane/1 NH$_3$/2 O$_2$/1 H$_2$O. The contact time was 2.2 seconds.

TABLE 1

| Example | Conversion of Propane, % | Yields, % | | | | Selectivities, % | | | |
|---|---|---|---|---|---|---|---|---|---|
| | | AN | HCN | C$_3$= | Sum* | AN | HCN | C$_3$= | Sum* |
| 3 | 13.1 | 7.7 | 1.4 | 0.6 | 9.7 | 58.7 | 10.9 | 4.9 | 74.5 |
| 4 | 14.2 | 7.9 | 1.4 | 1.1 | 10.4 | 55.3 | 10.0 | 7.4 | 72.7 |
| C | 9.7 | 5.6 | 1.2 | 0.4 | 7.2 | 57.8 | 12.4 | 4.0 | 74.2 |
| D | 6.7 | 3.7 | 1.0 | 0.3 | 4.9 | 55.0 | 14.2 | 4.3 | 73.4 |

*of AN + HCN + C$_3$=

As will be evident to those skilled in the art, various modifications of this invention can be made or followed in the light of the foregoing disclosure and discussion without departing from the spirit and scope of the disclosure or from the scope of the claims.

We claim:

1. A method of making a catalyst precursor having vanadium and antimony in oxide form in the atomic ratio of Sb to V in the range from 0.8 to 4, by aging an aqueous solution containing the monoperoxovanadium ion, VO(O$_2$)$_v$, until a vanadium-containing sol or gel is formed, and reacting said vanadium while in said aqueous sol or gel form, with an antimony compound which contains Sb having a valence of 3, thereby reducing the average valence of the vanadium to less than 5 and oxidizing antimony to a valence state of 5.

2. A method of claim 1 wherein said ratio is in the range from 1 to 3.

3. A method according to claim 1 with the additional steps of drying said precursor and thereafter calcining the resulting dried product at a maximum temperature in the range 650° to 1000° C., thereby producing a catalyst.

4. A method of claim 3 wherein said temperature is in the range 700° to 875° C.

5. A method of claim 3 wherein said temperature is in the range 750° to 850° C.

6. A method of claim 1 wherein said vanadium compound is a vanadium oxide.

7. A method of claim 1 wherein said antimony compound is an antimony oxide.

8. A method according to claim 3 wherein the drying step is a spray drying step and the catalyst produced is microspheroidal and has spheroids with particle diameters in the range from 10 to 200 microns.

9. A method of making a catalyst precursor having vanadium and antimony in oxide form in the atomic ratio of Sb to V in the range from 0.8 to 4, by reacting a vanadium compound with an aqueous hydrogen peroxide solution to form a dispersion containing the monoperoxovanadium ion, VO(O$_2$)$^+$, in solution until a vandaium-containing sol or gel is formed, aging the reaction solution, and reacting the latter with an antimony compound which contains Sb having a valence of 3, thereby reducing the average valence of the vanadium to less than 5 and oxidizing antimony to a valence state of 5, wherein the ratio of moles of H$_2$O$_2$ to atoms of V is at least 1.

10. A method of claim 9 wherein said ratio is in the range from 1 to 3.

11. A method according to claim 9 with the additional steps of drying said precursor and thereafter calcining the resulting dried product at a maximum temperature in the range 650° to 1000° C., thereby producing a catalyst.

12. A method of claim 11 wherein said temperature is in the range 700° to 875° C.

13. A method of claim 11 wherein said temperature is in the range 750° to 850° C.

14. A method of claim 10 wherein said vanadium compound is a vanadium oxide.

15. A method of claim 10 wherein said antimony compound is an antimony oxide.

16. A method according to claim 11 wherein the drying is a spray drying step and the catalyst produced is microspheroidal and has spheroids with particle diameters in the range from 10 to 200 microns.

17. A method according to claim 1 with the additional steps of drying said precursor and thereafter calcining the resulting dried product at a maximum temperature in the range 650° to 1000° C., thereby producing a catalyst.

18. A method of claim 17 wherein said temperature is in the range 700° to 875° C.

19. A method of claim 17 wherein said temperature is in the range 750° to 850° C.

20. A method according to claim 17 wherein the drying is a spray drying step and the catalyst produced is microspheroidal and has spheroids with particle diameters in the range from 10 to 200 microns.

* * * * *

UNITED STATES PATENT AND TRADEMARK OFFICE
CERTIFICATE OF CORRECTION

PATENT NO. : 4,879,264

DATED : Nov. 7, 1989

INVENTOR(S) : Mark A. Toft et al.

It is certified that error appears in the above-identified patent and that said Letters Patent is hereby corrected as shown below:

Claim 1, line 5, delete "$VO(O_2)_v$" and insert therefor--- $VO(O_2)+$---.

Claim 9, line 7, delete "vandaium" and sert therefor--- vanadium ---.

Signed and Sealed this

Twenty-fourth Day of April, 1990

Attest:

HARRY F. MANBECK, JR.

Attesting Officer      Commissioner of Patents and Trademarks

UNITED STATES PATENT AND TRADEMARK OFFICE
CERTIFICATE OF CORRECTION

PATENT NO. : 4,879,264

DATED : November 7, 1989

INVENTOR(S) : Mark A. Toft et al

It is certified that error appears in the above-identified patent and that said Letters Patent is hereby corrected as shown below:

Column 6, claim 9, beginning in the sixth line after "solution" delete "until a vanadium-containing sol or gel is formed".

Column 6, line 8, claim 9, after "solution" insert -- until a vanadium-containing sol or gel is formed--.

Signed and Sealed this

Eleventh Day of June, 1991

Attest:

HARRY F. MANBECK, JR.

*Attesting Officer*

*Commissioner of Patents and Trademarks*